United States Patent
Sassin

(10) Patent No.: US 11,436,221 B1
(45) Date of Patent: Sep. 6, 2022

(54) AUTONOMOUS TESTING OF LOGICAL MODEL INCONSISTENCIES

(71) Applicant: Oracle International Corporation, Redwood Shores, CA (US)

(72) Inventor: Michael Sassin, Andover, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/230,167

(22) Filed: Apr. 14, 2021

(51) Int. Cl.
  *G06F 16/22* (2019.01)
  *G06F 16/242* (2019.01)
  *G06F 16/2452* (2019.01)
  *G06F 16/2457* (2019.01)
  *G06F 16/248* (2019.01)

(52) U.S. Cl.
  CPC ...... *G06F 16/24522* (2019.01); *G06F 16/221* (2019.01); *G06F 16/2282* (2019.01); *G06F 16/248* (2019.01); *G06F 16/2423* (2019.01); *G06F 16/24573* (2019.01)

(58) Field of Classification Search
  CPC ............. G06F 16/24522; G06F 16/221; G06F 16/2282; G06F 16/2423; G06F 16/24573; G06F 16/248
  See application file for complete search history.

(56) References Cited

U.S. PATENT DOCUMENTS 5,021,997 A * 6/1991 Archie ................ G06F 11/2257 702/123
6,081,811 A * 6/2000 Nilsson ................ G06F 16/258 707/999.102

(Continued)

FOREIGN PATENT DOCUMENTS

EP 0910024 A2 4/1999
WO 2020259309 A1 12/2020

OTHER PUBLICATIONS

Unknown, OBIEE Metadata Repository Deployment Guide Oracle FLEXCUBE Universal Banking, Release 12.4.0.0.0, May 2017, pp. 1-1-1-28.

(Continued)

*Primary Examiner* — Jorge A Casanova
(74) *Attorney, Agent, or Firm* — Potomac Law Group, PLLC

(57) ABSTRACT

Embodiments autonomously test a logical model for inconsistencies. For example, metadata descriptive of a logical model can be received, where the logical model includes an abstraction for a database schema, the database schema is implemented at a database, and the database schema includes a fact table and a dimension table. Logical queries can be automatically generated including at least first and second logical queries based on the retrieved metadata, where the first and second logical queries target a logical object of the logical model. At least the first and second logical queries can be issued to a server that hosts the logical model, where, at the server, the first and second logical queries are translated to first and second database queries, and the first and second database queries target at least a fact table and a dimension table from the database schema. Query results received from execution of the first and second database queries can be compared. Inconsistencies can be identified when the comparison of the query results does not meet a criterion.

20 Claims, 10 Drawing Sheets

(56) References Cited

U.S. PATENT DOCUMENTS

| | | | |
|---|---|---|---|
| 7,930,293 B2* | 4/2011 | Fox | G06F 16/288 |
| | | | 707/713 |
| 2010/0287185 A1 | 11/2010 | Cras et al. | |
| 2016/0078064 A1 | 3/2016 | Sassin | |
| 2016/0357789 A1* | 12/2016 | Contessa | G06F 16/215 |
| 2020/0192903 A1* | 6/2020 | Bansal | G06F 16/2237 |
| 2020/0218717 A1* | 7/2020 | Sharma | G06F 16/2425 |
| 2020/0294642 A1* | 9/2020 | Bostic | G16H 20/10 |
| 2021/0182293 A1* | 6/2021 | Zhang | G06F 16/24542 |
| 2021/0202103 A1* | 7/2021 | Bostic | G16H 50/80 |

OTHER PUBLICATIONS

Unknown, Oracle Business Intelligence, Standard Edition One Tutorial, Release 10g (10.1.3.2.1) E10312-01, May 2007, 226 pages.
International Search Report and Written Opinion for Application No. PCT/US2020/016435 dated May 25, 2022.

\* cited by examiner

```
SELECT "Asset - Service History"."Permit"."Permit ID" as c1,
       "Asset - Service History"."Service History"."Count of Service Histories" as c2
FROM "Asset - Service History"."Service History"
```
— 602

| c1 | c2 |
|---|---|
| varchar | integer |
| 8036543220568 | 4 |
| 1457133332156 | 15 |
| 7736548320151 | 1 |
| 7845852643032 | 2 |
| 4482141261771 | 3 |
| 7927558168858 | 8 |
| 0250159386800 | 2 |
| 4048915039701 | 1 |
| 3858885322711 | 1 |
| 4070787491311 | 1 |
| , | 3447 |
| 4229903676861 | 1 |
| 9474891194971 | 7 |
| 2338993062381 | 7 |
| 0776111682531 | 1 |
| 8610633384701 | 1 |

```
SELECT RANK("Asset - Timesheet Detail"."Timesheet"."Timesheet ID" ) c1,
SUM("Asset - Timesheet Detail"."Timesheet Detail"."Timesheet Detail Count") c2,
SUM("Asset - Timesheet Detail"."Timesheet Detail"."Total Cost") as c3
FROM "Asset - Timesheet Detail"."Timesheet Detail"
WHERE C1 = 1
```
802

Issue SQL | Oracle Analytics Server Logging Level Default ▼ ☑ Use Oracle

| c1 | c2 | c3 |
|---|---|---|
| integer | integer | double |
| 1 | 1659 | 510589.45 |

AUTONOMOUS TESTING OF LOGICAL MODEL INCONSISTENCIES

FIELD

The embodiments of the present disclosure generally relate to autonomously testing a logical model for inconsistencies.

BACKGROUND

The proliferation of computing and connected devices has generated vast amounts of data that requires management. Challenges persist for aspects of data management and access, such as efficient querying of complex data schemas. Some modern database implementations include a layer that abstracts complex data schemas to logical models, for example to support logical queries in a more simplified form. In addition, extraction, transformation, and load ("ETL" or "ELT") flows can be used to populate databases that implement complex schemas. Due to the number and variety of issues that can arise based on the complexity of these components and their interactions, aspects of data management and access can be cumbersome when leveraging conventional techniques.

SUMMARY

The embodiments of the present disclosure are generally directed to systems and methods for autonomously testing a logical model for inconsistencies that substantially improve upon the related art.

Metadata descriptive of a logical model can be received, where the logical model includes an abstraction for a database schema, the database schema is implemented at a database, and the database schema includes a fact table and one or more dimension tables. A plurality of logical queries can be automatically generated including at least a first logical query and a second logical query based on the retrieved metadata, where the first logical query and second logical query target a logical object of the logical model. At least the first logical query and the second logical query can be issued to a server that hosts the logical model, where, at the server, the first logical query is translated to a first database query and the second logical query is translated to a second database query, and the first database query and second database query target at least a fact table and a dimension table from the database schema. Query results received from execution of the first database query and second database query can be compared. One or more inconsistencies can be identified when the comparison of the query results for the first database query and second database query does not meet a criterion, where the one or more inconsistencies include an inconsistency with the logical model as defined by the metadata or an inconsistency at the database.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIGS. 5 and 6 illustrate a pair of database queries and their results according to an example embodiment.

FIGS. 7 and 8 illustrate another pair of database queries and their results according to an example embodiment.

DETAILED DESCRIPTION

Figure 1:
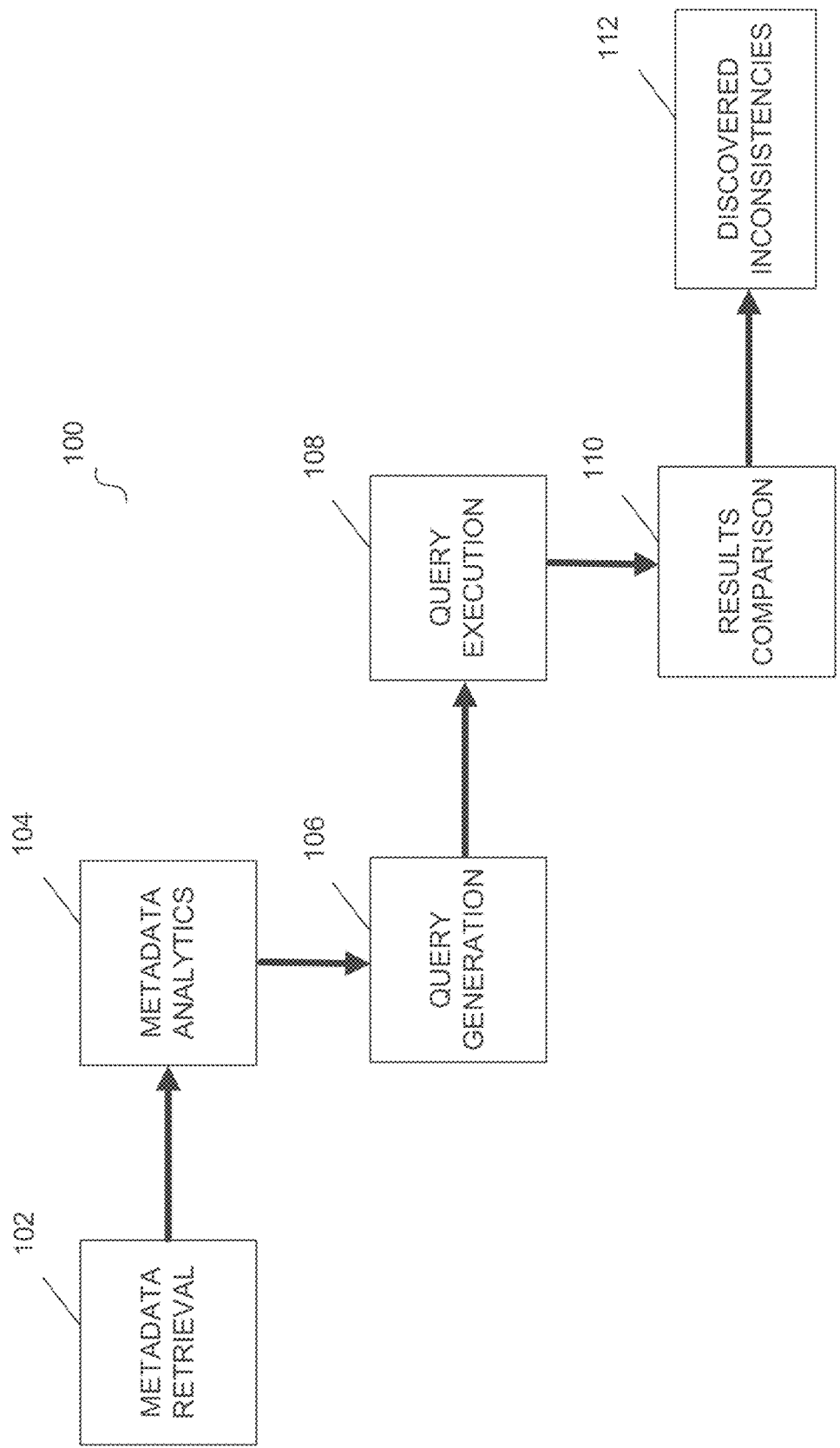
FIG. 1 illustrates a system for autonomously testing a logical model for inconsistencies according to an example embodiment.

Embodiments achieve autonomous testing of a logical model for inconsistencies. For example, data schemas can at times require complex queries that target relevant data from numerous tables/fields using joins and other sophisticated query structures. To alleviate this query burden, some databases implementations and reporting tools include a logical model, or a layer that maps the underlying complex data schema to a more simplified logical model. For example, the logical model can then be queried using more simplistic logical queries, which can be translated to queries that target the underlying data schema (e.g., translated into complex queries that can access/retrieve data from the underlying data schema).

Some embodiments of logical models can include multiple layers of intricacies, including various aggregation functionality, drill-down functionality, join behaviors, and much more. For example, one or more tools can be used to rapidly develop a complex logical model, such as by defining metadata that can be used to deploy the model. In some embodiments, a tool can be used to define a conceptual data model through a user interface, and the output of such a tool can be metadata that stores the conceptual relationships of the components that comprise the logical data model.

In some embodiments, these tools can improve the efficiency of deploying a complex database, however the deployment can sometimes include low level inconsistencies and/or flaws. For example, aggregation functionality defined in the logical model may not align with the underlying data schema, one or more tables may not be properly loaded, the configurations for a data field (e.g., cannot be null) may not be properly set, and many more. These inconsistencies and/or flaws conventionally require detailed manual effort to debug.

Embodiments generate queries based on the metadata for a logical model that autonomously test for inconsistencies and/or flaws in the logical model's implementation with the underlying data schema. For example, metadata for a logical model can be retrieved and analyzed to determine conceptual relationships among the components of the model. In some embodiments, queries can be generated based on the expected behavior of the logical model and data schema given the analyzed metadata. For example, a pair of queries can be generated that test for expected aggregation functionality (e.g., across one or more dimensions of the data schema).

Embodiments analyze the results of the queries. For example, two or more queries can be designed to return a similar result set (e.g., the same data values) when the logical data model accurately reflects the data relationships in the data schema. Returned result sets that are not similar for these two or more queries can indicate an inconsistency with the logical model. In other examples, query errors may be returned due to improper loading of data, missing database tables or columns, incorrect embedded SQL expressions, and/or improper configuration for data fields. In some embodiments, these results that deviate from expected results can be used to identify one or more of these inconsistencies.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for autonomously testing a logical model for inconsistencies according to an embodiment. System 100 includes metadata retrieval 102, metadata analytics 104, query generation 106, query execution 108, results comparison 110, and discovered inconsistencies 112. Metadata retrieval 102 can include the retrieval of metadata for a logical data model, such as metadata that defines conceptual relationships among the components of the logical model (e.g., data tables, columns, keys, joins, and the like). Metadata analytics 104 can analyze the retrieved metadata to identify these conceptual relationships. Query generation 106 can generate queries, such as pairs of queries, series of related queries, and the like, based on the expected behavior of a logical model and data schema given the analyzed metadata. For example, a pair of queries can be generated that test for expected aggregation functionality (e.g., across one or more dimensions of a logical model), and other suitable queries can be generated.

Query execution 108 can execute the queries using a server that implements the logical model and at a database that implements the data schema. For example, query execution can include the server translating the generated queries (e.g., logical queries) into translated queries (e.g., data schema queries) such that the translated queries can used to retrieve data from the implementation of the data schema (e.g., database). In some embodiments, result sets from executing the translated queries at the database can be returned. Results comparison 110 can compare the results of the queries to identify inconsistencies (e.g., where consistency is expected) or other unexpected behavior.

For example, a generated pair (or set) of queries may be designed to return similar results (e.g., a result set with one or more values that are at most a threshold different), such as when the logical data model accurately reflects the data relationships in the data schema. Inconsistencies can be identified when results comparison 110 determines that two or more queries designed for similar results have actually returned results sets that are not similar. In addition, some queries may return errors due to improper loading of data or improper configuration for data fields. In some embodiments, these results that deviate from expected results can be used to identify inconsistencies (e.g., between the data model and the implemented data schema, inconsistency based on incorrectly loaded data, and others).

In some embodiments the underlying data schema (e.g., implemented at the database) can be any suitable schema for storing data, such as a set of relational data tables, multi-dimensional data schemas, a set of relational tables configured according to a set of rules or standards, such as a Third Normal Form ("3NF") schema, and any other suitable schemas. Generally, a schema will include data tables with one or more columns of data. The schema is defined not only by the tables and the data they store, but the relationships between the tables. For example, a relationship between a first table and a second table can be defined by a foreign key that links the data stored in each of the tables. In some embodiments, two tables may share multiple relationships (e.g., can have multiple foreign keys that define relationships between the tables). Different types of relationships between tables will be further disclosed herein.

The design of a data schemas and logical models can often vary based on the designer. For example, a given set of data with a given set of relationships can be successfully represented by a number of data schemas with varying designs and/or logical models. Some designs may require a table join to retrieve a certain set of data while the other designs do not. Accordingly, the data schema and logical model under test can include any suitable design choice, and the queries generated by query generation 106 and executed by query execution 108 can be designed to test for inconsistencies and/or flaws for a variety of different data schemas and logical models.

Figure 2:
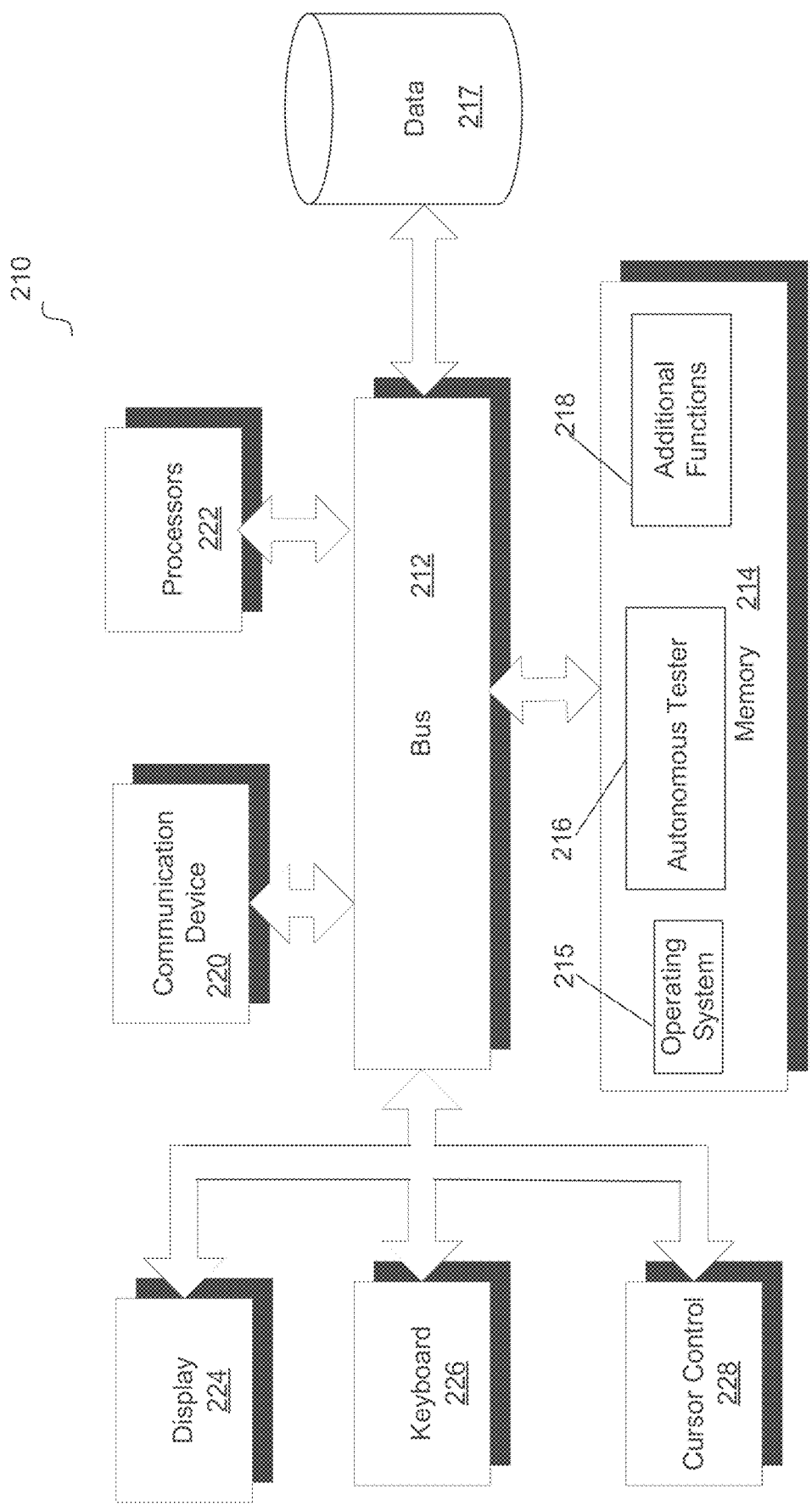
FIG. 2 illustrates a block diagram of a computing device operatively coupled to an autonomous tester according to an example embodiment.

FIG. 2 is a block diagram of a computer server/system 210 in accordance with embodiments. As shown in FIG. 2, system 210 may include a bus device 212 and/or other communication mechanism(s) configured to communicate information between the various components of system 210, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 210. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, autonomous tester 216, and other applications 218, stored within memory 214.

System 210 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 210. The modules can include an operating system 215, autonomous tester 216, as well as other applications modules 218. Operating system 215 provides operating system functionality for system 210. Autonomous tester 216 may provide system functionality for autonomously testing a data schema for inconsistencies, or may further provide any other functionality of this disclosure. In some instances, autonomous tester 216 may be implemented as an in-memory configuration.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 210.

In some embodiments, system 210 can be part of a larger system. Therefore, system 210 can include one or more additional functional modules 218 to include the additional functionality. Other applications modules 218 may include various components of a data warehouse that includes operational systems and a data warehouse target, Oracle® Business Intelligence ("BI"), Oracle® Analytics Cloud Oracle® Analytics Server, and other suitable components, for example. A database 217 is coupled to bus 212 to provide centralized storage for modules 216 and 218 and to store, for example, wireless device activity, and in some embodiments, user profiles, transactions history, etc. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, Hadoop Distributed File System ("HFDS"), or any other database known in the art.

Although shown as a single system, the functionality of system 210 may be implemented as a distributed system. For example, memory 214 and processor 222 may be distributed across multiple different computers that collectively represent system 210. In one embodiment, system 210 may be part of a device (e.g., smartphone, tablet, computer, etc.). In an embodiment, system 210 may be separate from the device, and may remotely provide the described functionality for the device. Further, one or more components of system 210 may not be included. For example, for functionality as a user or consumer device, system 210 may be a smartphone or other wireless device that includes a processor, memory, and a display, does not include one or more of the other components shown in FIG. 2, and includes additional components not shown in FIG. 2.

Referring back to FIG. 1, embodiments autonomously test a logical model for inconsistencies using queries that are targeted using metadata for the logical model. For example, one or more tools can be used to generate metadata that defines a logical model, such as tools that define a repository file (e.g., RPD file). The repository file can define data structures (e.g., relational tables and/or logical objects), data fields (e.g., columns), relationships among the data structures (e.g., foreign keys, joins, and the like), functionality for the data (e.g., aggregation functionality, drill keys, and the like), and other logical model related information.

Figure 3:
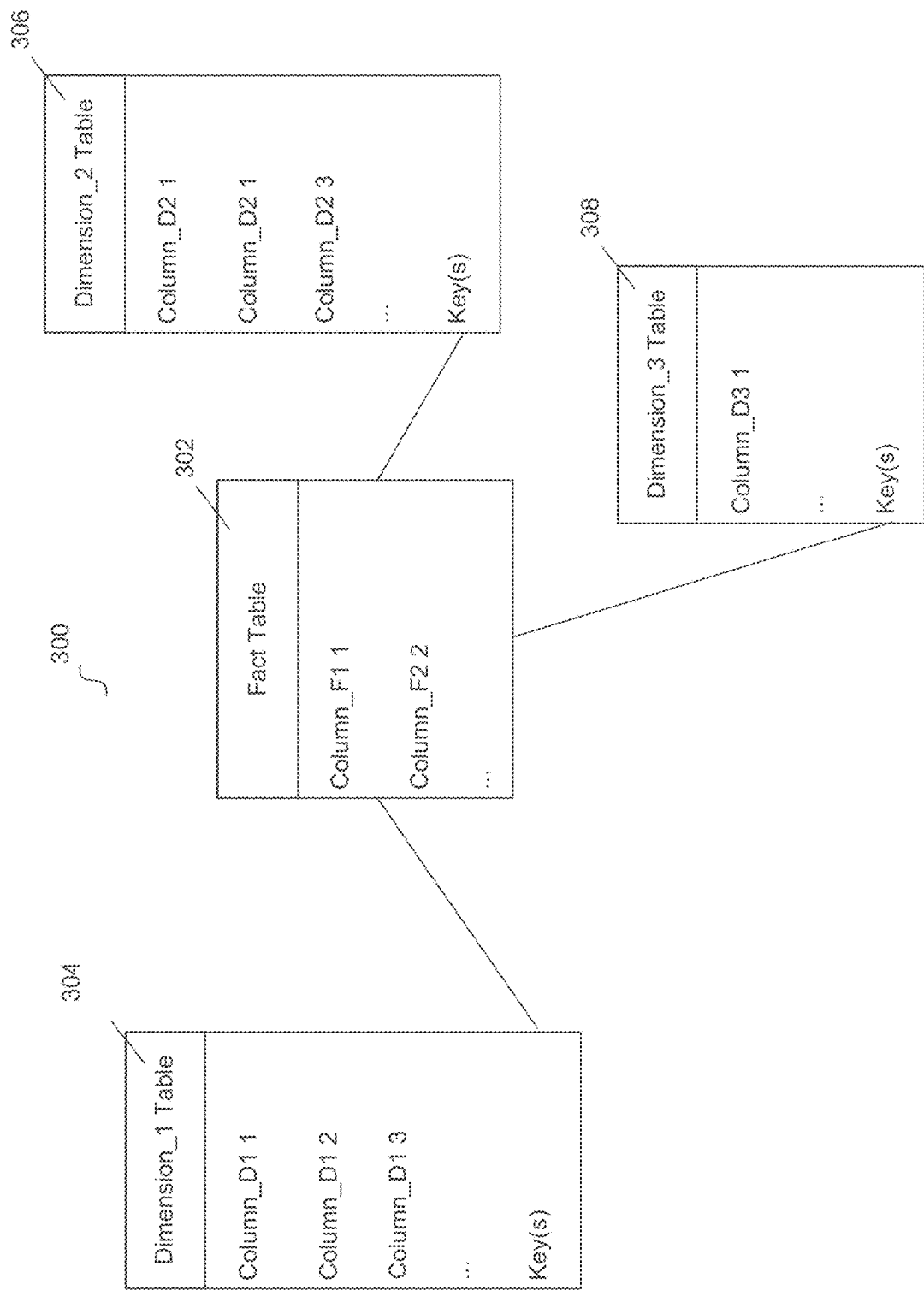
FIG. 3 illustrates a sample star data schema according to an example embodiment.

Embodiments of the logical model are a logical abstraction of an underlying data schema. FIG. 3 illustrates a sample star data schema according to an example embodiment. Data schema 300 includes fact table 302, dimension_1 table 304, dimension_2 table 306, and dimension_3 table 308. Generally, in a star schema, a fact table holds facts about a domain while the dimension table holds attributes for these facts. As a result, fact table 302 has various foreign key relationships with dimension_1 table 304, dimension_2 table 306, and dimension_3 table 308. In other words, some of the rows in the fact table are foreign keys ("FKs"). A foreign key can be a link to a dimension table. A dimension table can be a table that stores context associated with an event that is referred to by one or more fact tables.

A star data schema is similar to a snowflake data schema, with some differences. For example, a snowflake data schema includes dimensions that are normalized into multiple related tables while a star schema has dimensions that are denormalized with each dimension being represented by a single table. Each of these schema provide different advantages related to data redundancy, simplicity of query design, and the like. For example, the storage efficiency benefits of normalization can result in trade-offs to the efficiency of querying a normalized data schema. Embodiments of the data schema under test can include fact tables with connections to dimension tables, tables organized as a star schema, tables organized as a snowflake schema, and any other suitable data schema structure.

Embodiments of a logical model can be used to abstract an underlying data schema such that a client (e.g., end user) can issue logical queries that are translated (e.g., using metadata for the logical model). For example, the translated queries can be used to query against the database (e.g., implementation of the data schema with populated data) to retrieve a result set. Embodiments of the logical model are defined using metadata, and associated business intelligence functionality can be generated based on the metadata. For example, the business intelligence functionality can include multiple layers, such as one or more of a physical layer, business model/mapping layer, and presentation layer.

An example physical layer can define objects and relationships used to write native queries against each physical data source (e.g., used to translate logical queries). For example, the physical layer can be created by importing tables, cubes, and flat files from data sources. Separating logical behavior from the physical model provides the ability to federate multiple physical sources to the same logical object, enabling aggregate navigation and partitioning, as well as dimension conformance and isolation from changes in the physical sources.

An example business model/mapping layer can define a business or logical model of the data and specify a mapping between the logical model and the physical schemas. For example, this layer can determine the analytic behavior seen by clients/end users, and can define a superset of objects and relationships available to clients/end users. In some embodiments, each column in the business model can map to one or more columns in the Physical layer. At run time, logical SQL requests can be evaluated against the business model, and the mappings can be used to determine a set of physical tables, files, and cubes for generating the relevant physical queries. Mappings can contain calculations and transformations, and may combine multiple physical tables in some implementations.

An example presentation layer provides a mechanism to present customized, secure, role-based views of a business model to users. For example, the presentation layer can add a level of abstraction over the business model and mapping layer and provide a view of the data seen by users building requests. In some embodiments, multiple subject areas can be created by the presentation layer that map to a single business model, effectively breaking up the business model into manageable pieces.

To illustrates query translation, consider the following sample logical query that may be received at a server that hosts a logical model:

SELECT
"D0 Time"."T02 Per Name Month" saw_0,
"D4 Product"."P01 Product" saw_1,
"F2 Units"."2-01 Billed Qty (Sum All)" saw_2
FROM "Sample Sales"
ORDER BY saw_0, saw_1

In some embodiments, the server may translate such a logical query into one or more translated queries, or one or more queries designed for the underlying data schema/database. Consider the following sample query translated by the server based on the received logical query.

WITH SAWITH0 AS (
select T986.Per_Name_Month as c1, T879.Prod_Dsc as c2,
sum(T835.Units) as c3, T879.Prod_Key as c4
from
Product T879 /* A05 Product */,
Time_Mth T986 /* A08 Time Mth */,
FactsRev T835 /* A11 Revenue (Billed Time Join) */
where    (T835.Prod_Key=T879.Prod_Key    and T835.Bill_Mth=T986.Row_Wid)
group   by   T879.Prod_Dsc,   T879.Prod_Key, T986.Per_Name_Month
)
select SAWITH0.c1 as c1, SAWITH0.c2 as c2, SAWITH0.c3 as c3
from SAWITH0
order by c1, c2

As demonstrated by this translation, the simplified logical query that targets logical objects in the logical model is translated into a database query that targets specific components of the data schema. In particular, certain elements of the data schema are abstracted as logical components (e.g., logical objects) in the logical query, and these abstractions are mapped to their underlying physical components in the translated query. This example demonstrates why the definitions in the logical model are impactful to querying a database that implements a data schema, as issues with the query translation or other components of the logical model can create flawed or erroneous results.

Conventional functional tests for a logical model often rely on patterns to validate that metadata is correctly translated (e.g., into RPD models). While such tests can validate that an RPD model works as designed, these tests do not guarantee that the created solution will work with the underlying data schema (e.g., will generate expected results). For example, full validation of the generated models would require significant manual effort due to the size of complex models.

Logical models created using conventional generators often lead to model defects and performance issues, for example detected as a side-effect of other development activities. These findings suggest that conventional models may have undetected consistency issues. For example, example classes of potential errors that can result in incorrect behavior include:

The RPD model may not be well suited for some unanticipated cases, resulting in model defects.

Dimension may be described in metadata as required but the underlying data suggest that the data is optional or nullable (e.g., likely caused by incorrectly defined fact FK column metadata).

Tables are not correctly/fully loaded, which may be a common issue for calendar and time dimensions and may be an issue for improperly loaded aggregate tables.

Performance for some queries may degrade unexpectedly when adding an attribute to a query (e.g., may be caused by description columns not being correctly modeled or implemented).

Embodiments demonstrate that a systematic and automatic test of a logical data model (e.g., an RPD) can be performed to enhance model quality and/or logical model to data schema alignment. For example, embodiments of the audit tool can autonomously detect data or logical model inconsistencies based on one or multiple predefined test strategies. In some embodiments, one or more metadata services can be used to retrieve metadata (e.g., via a web service) that is descriptive of the logical model, including subject areas, tables, and columns. The metadata for the logical model can be used by embodiments to generate a series of logical queries that are issued (e.g., against the server using a web service). For example, a logical layer may translate logical queries into translated queries (e.g., designed to query the underlying data schema), which are ultimately used to query the database. The query results can be captured and compared for consistency, and those with inconsistent results can be flagged.

Figure 4A:
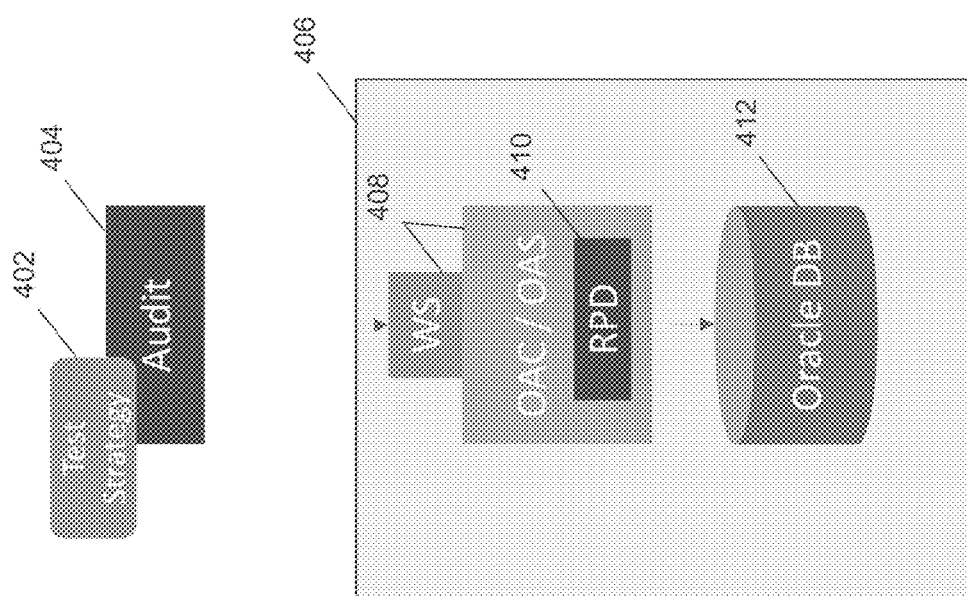
FIGS. 4A and 4B illustrate an implementation of a system for autonomously testing a logical model for inconsistencies according to an example embodiment.
Figure 4B:
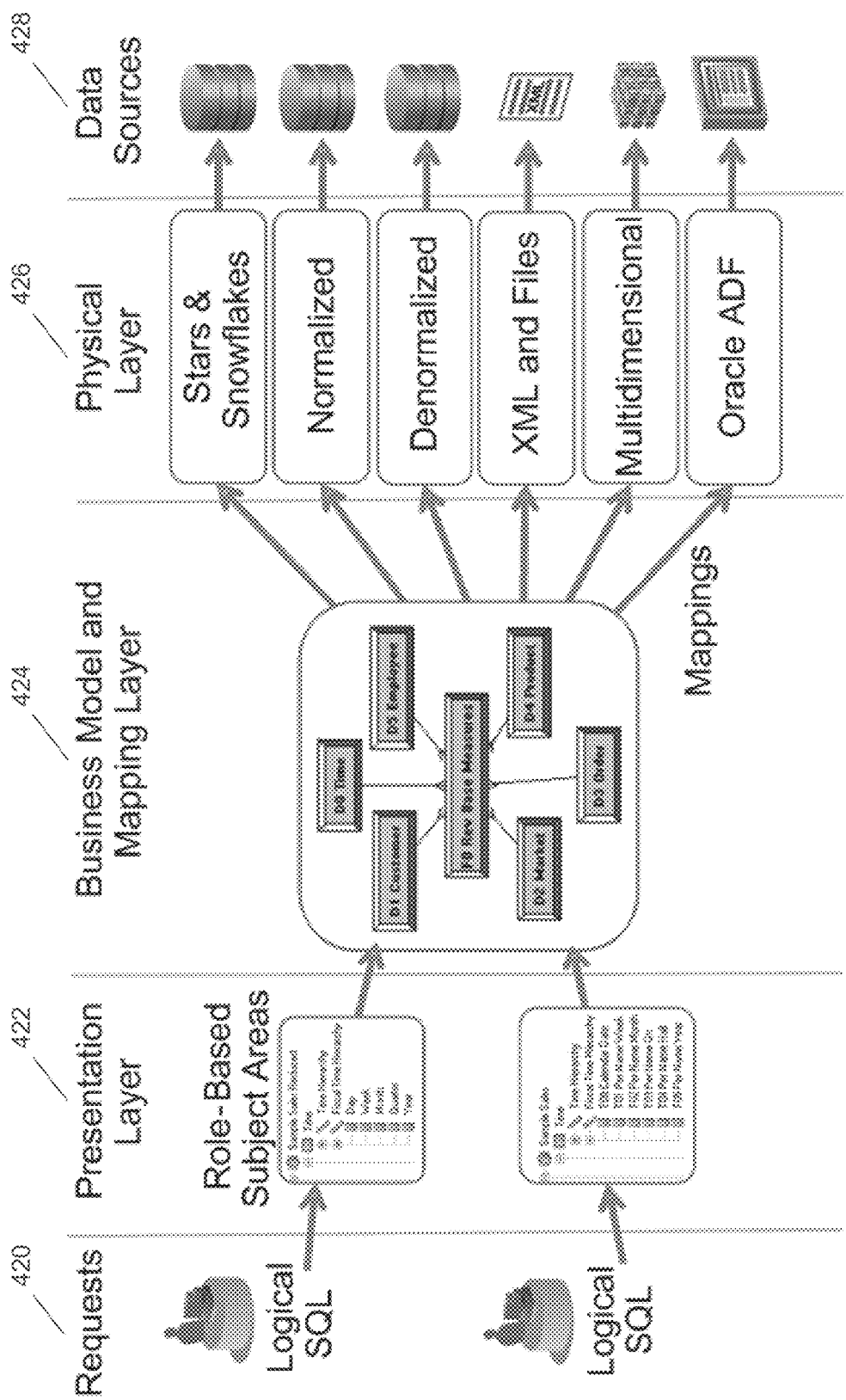

FIGS. 4A and 4B illustrate an implementation of a system for autonomously testing a logical model for inconsistencies according to an example embodiment. For example, the system of FIG. 4A depicts test strategy 402, autonomous dimensional tester ("Audit") 404, server 406, web service 408, semantic model 410, and database 412. Test strategy 402 can include software functionality used to generate the test queries based on the metadata that defines a data schema. For example, based on the data structures and relationships among the structures indicated by retrieved metadata, test strategy 402 can implement software functionality to generate audit queries.

Audit 404 can implement test strategy 402 to generate the audit queries, issue the queries to be executed, receive the results of the audit queries, and analyze the results to detect inconsistencies and/or flaws in semantic model 410. In some embodiments, test strategy 402 and audit 404 can be implemented at a client device, server, any cloud computing device, or any other suitable computing device.

Server 406 can be one or more servers (e.g., web servers, cloud servers, virtual machines, and the like) that host web service 408, store semantic model 410, and/or implement database 412. For example, server 406 can include components of a business intelligence product (e.g., Oracle® Business Intelligence), analytics product (e.g., Oracle® Analytics Server and/or Oracle® Analytics Cloud), data warehouse (e.g., Oracle® data warehouse), and the like. In some embodiments, server 406 implements the query translation techniques for translating logical queries to queries designed for the underlying database/data schema.

For example, server 406/semantic model 410 can include associated business intelligence functionality as illustrated by FIG. 4B. FIG. 4B depicts logical queries 420, presentation layer 422, business model/mapping layer 424, physical layer 426, and data sources 428. In some embodiments, Audit 404 can issue logical queries 420 (based on retrieved metadata) to server 406, which can in turn translate the logical queries via presentation layer 422, business model/ mapping layer 424, and physical layer 426, and ultimately issue the translated queries against data sources 428 (e.g., database 412 of FIG. 4A). The result sets from query data sources 428 using the translated queries can then be returned to Audit 404.

In some embodiments, web service 408 can be configured to provide Audit 404 with metadata about semantic model 410, for example in response to an application programming interface ("API") call from Audit 404. For example, Audit 404 can include a web service API abstraction that abstracts web service calls to server 406. In some embodiments, the abstraction provides the implementation extensibility such that alternatives can be used (e.g., a REST-based API).

In some embodiments, web service 408 includes a metadata service that describes the subject areas using an enriched data structure that describes tables (e.g., fact, dimension, time dimension) and dimension details (e.g., description columns, bin and binned columns, hierarchies and details such as levels, drill keys, description keys, and the like). For example, web service 408 can include the Oracle® Analytics Cloud ("OAC") web service and/or the Oracle® Analytics Server ("OAS") web service.

In some embodiments, a web service provided by OAC can be accessed through a simple object access protocol ("SOAP") client (e.g., to reduce overhead). For example, a SOAP client API at Audit 404 can be encapsulated in a class to minimize dependency of other logic onto the specific SOAP client implementation. In some embodiments, web service 408 can provide techniques to log on and off the web services, retrieve semantic model 410 metadata (e.g., RPD metadata) for different objects, and issue logical SQL queries. In some embodiments, web service 408 can return objects that hide some of the implementation details of the API. For example, extensible markup language ("XML") documents can be converted into an object representation, such as lists or strings, dictionaries, or other objects.

In some embodiments, web service 408 can support the following web services:

SAWSessionService to login to the web service and logoff after using it,

Metadata Service to retrieve the subject area names and subject area, table, and column descriptions (indicates column type, if hidden, and if description column), XMLViewService to issue logical SQL queries and retrieve the results sets, NQSQueryMetadataObjects to retrieve metadata as XUDML fragments. In some embodiments, the retrieved XML is parsed to extract the relevant details.

In some embodiments, base metadata, such as the names of subject areas, details of presentation table, and their columns can be retrieved using the OAC metadata service. In some embodiments, detailed information about dimensions and columns can be retrieved using the NQSQueryMetadataObjects web service. Variances of the XUDML returned by the NQSQueryMetadataObjects web service for each type of information may be present in some implementations, and in this case Audit 404 can include one or more specific APIs that are configured to retrieve metadata for different object types.

In some embodiments, web service 408 can represent subject areas, presentation tables, and presentation columns by a simple object model that enhances the base information of the model (e.g., retrieved using the OAC metadata service).

Tables can be classified as fact or dimension tables.

The dimension table model can provide a representation of associated hierarchies, levels, drill keys, and associated columns.

Dimension and fact attribute columns can be extended to include flags indicating if a column is a description or bin column, is calculated, is a primary key ("PK") column, and the like.

Fact measures can provide additional details on the advanced aggregation rules (e.g., semi-additive measures), if the column is calculated, and certain details about level-based measures.

In some embodiments, Audit 404 can include software to identify fact tables based on the existence of measures (e.g., columns with aggregate functions). Web service 408 can also include the NQSQueryMetadataObjects service, which can return XUDML fragments that describe the presentation, logical, and/or physical RPD model.

In some embodiments, metadata queries from Audit 404 can be addressed with the assistance of the NQSQueryMetadataObjects service of the web service 408. For example, the NQSQueryMetadataObjects service can return:

PK columns and drill keys,
levels and hierarchies (including the order of levels),
attributes associated with a level,
identify columns that are calculated (pre- or post-aggregation),
level-based measures, and
measures with dimension-based aggregation rules.

In some embodiments, to retrieve detailed table and column features, the algorithms can trace presentation objects to the related logical (or even physical) object using fully qualified names in references or parents. In some embodiments, logical table names include certain naming conventions that are to be processed, such as processing to strip the "Dim-", "Fact", and "Hier-" prefix to define English name of the matching presentation object. In some embodiments, the trade-off is fewer round-trips to retrieve XUDML fragments and therefore increased test throughput.

Embodiments of Audit 404 and web service 408 aim to balance functionality and performance using one or more the following techniques:

Retrieve subject area names using the OAC metadata service.

Retrieve metadata by subject area:
  Retrieve metadata describing one subject area, its presentation tables, and presentation columns in scope using the OAC metadata service.
  Retrieve XUDML metadata for each subject area table column in scope using the web service call NQSQueryMetadataObjects ('4008', '<Table name>', '"<SA Name>"." "', 'true') for each presentation table in the subject area. This information can be used to determine the reference to the logical column.
  Retrieve logical keys using call NQSQueryMetadataObjects ('2008') to get the association of the drill key to the logical columns.

In some embodiments, these columns can be matched up with the presentation columns (e.g., info previously retrieved) to determine which presentation column is a drill key or a PK of the table. In some embodiments, retrieval of the logical keys includes a bulk operation, for example because the logical dimension (e.g., hierarchy object) is related through its drill-key. For example, at times the number of (drill) keys is relatively small in comparison to the number of columns, and thus the bulk operation based on drill-key can improve performance. In addition, performance issues can be mitigated by caching results to eliminate additional round trips when other dimensions tables are analyzed. In some embodiments, an alternative to this approach is to determine the logical dimension object that is referenced from the presentation dimension table. This would allow retrieval of the logical levels. However, this involves two service calls per presentation table in some implementations.

Embodiments can similarly implement other suitable techniques to retrieve metadata. For example, one or more other APIs may be used (or other interface/retrieval abstractions) to retrieve the metadata, the metadata may be retrieved based on other aspects (e.g., other than subject area), and/or any other suitable techniques can be implemented.

In some embodiments, for additional hierarchy and level details Audit 404 can issue a query for dimensions using call NQSQueryMetadataObjects('2019') and subsequently issue query NQSQueryMetadataObjects('2019', ",", 'true') to retrieve level details. This retrieved data can be used to reconstruct the hierarchies and to order (drill) keys according to the levels (e.g., from detail to grand total). In some embodiments, Audit 404 can run this as a bulk operation and cache the results. In some embodiments, the alternative can be to use the presentation table metadata and the logical dimension (e.g., hierarchy) object that is referenced from the presentation dimension table.

In some embodiments, the metadata retrieved (e.g., from server 406) using web service 408 does not indicate if tables in a subject area are dimensions or a fact table. However, a table column can indicate the columns' name, description, data type, and aggregation rule. In some embodiments, a table that contains at least one column with a defined aggregation type can be considered a fact table and columns in a fact table with a defined aggregation rule can be considered measures.

In some embodiments, calendar dimension table names may end with "Date" and time dimension table names end with "Time". Implementations may also include a shrunken calendar dimension that may end with "Month", "Quarter", "Year", "Period", "Fiscal Quarter", or "Fiscal Year".

| Classification | Property | Regular Expression |
| --- | --- | --- |
| Calendar Dim | calendar_dim | \\w+ - Date |
| Shrunken Calendar Dim | shrunken_calendar_dim | \\w+ \[ Month\| Quarter\| Year\| Period\| Fiscal Quarter\| Fiscal Year] |
| Time Dim | time_dim | \\w+ - Tate |

In some embodiments, Audit 404 can identify certain qualities of a data schema based on naming conventions. Audit 404 can determine relevant relationships in the data schema based on metadata retrieved from the OAC metadata web services of web services 408. In some embodiments, XUDML fragments retrieved through the NQSQueryMetadataObjects web service of web services 408 are analyzed to determine relevant relationships for query generation. For example, the analyses can rely on mappings between the presentation levels and logical levels, which define drill keys and other relevant features for query generation. XUDML parts describing presentation hierarchies can be retrieved by issuing the command "call NQSQueryMetadataObjects ('4028')". The result can be provided in multiple recorders with a sequence of the levels from grand total level to detail level, such as the example below:

```
<?xml version="1.0" encoding="UTF-8" ?>
<Repository xmlns:xsi="http://www.w3.org/2001/XMI.Schema-instance">
<DECLARE>
<PresentationHierarchy name="Acquisition Date—Acquisition Date Year" parentName=""Asset—Asset Availability Based on Downtime Service History&q . . . >
<Levels>
<Ref PresentationLevel id="4030:143750" uid="5ec6e2ae-0ceb-1000-aba9-c0a838680000" qualifiedName=""Asset—Asset Availability Based on Downtime Ser . . . >
<Ref PresentationLevel id="4030:143751" uid="5ec6e2af-0ceb-1000-aba9-c0a838680000" qualifiedName=""Asset—Asset Availability Based on Downtime Ser . . . >
<Ref PresentationLevel id="4030:143752" uid="5ec6e2b0-0ceb-1000-aba9-c0a838680000" qualifiedName=""Asset—Asset Availability Based on Downtime Ser . . . >
<Ref PresentationLevel id="4030:143753" uid="5ec6e2b1-0ceb-1000-aba9-c0a838680000" qualifiedName=""Asset—Asset Availability Based on Downtime Ser . . . >
<Ref PresentationLevel id="4030:143754" uid="5ec6e2b2-0ceb-1000-aba9-c0a838680000" qualifiedName=""Asset—Asset Availability Based on Downtime Ser . . . >
</Levels>
<Dimension>
<RefDimension id="2019:75664" uid="5ec6d5b4-0ceb-1000-aba9-c0a838680000" qualifiedName="" Customer" . " Acquisition Date""/>
</Dimension>
</PresentationHierarchy>
<PresentationHierarchy name="Acquisition Date—Acquisition Date Week Key" parentName=""Asset—Asset Availability Based on Downtime service Histo . . . >
<Levels>
<Ref PresentationLevel id="4030: 143755" uid="Sec6e2b4-0ceb-1000-aba9-c0a838680000" qualifiedName="" Asset—Asset Availability Based on Downtime Ser . . . >
<Ref PresentationLevel id="4030: 143756" uid="Sec6e2b5-0ceb-1000-aba9-c0a838680000" qualifiedName=""Asset—Asset Availability Based on Downtime Ser . . . >
<Ref PresentationLevel id="4030: 143757" uid="Sec6e2b6-0ceb-1000-aba9-c0a838680000" qualifiedName="" Asset—Asset Availability Based on Downtime Ser . . . >
</Levels>
<Dimension>
<RefDimension id="2019: 75664" uid="5ec6d5b4-0ceb-1000-aba9-c0a838680000" qualifiedName="" Customer" . " Acquisition Date""/>
</Dimension>
</PresentationHierarchy>
<PresentationHierarchy name="Acquisition Date—Acquisition Date Fiscal Year" parentName=""Asset—Asset Availability Based on Downtime Service Hi.
<Levels>
<Ref PresentationLevel id="4030: 143758" uid="5ec6e2b8-0ceb-1000-aba9-c0a838680000" qual . . . >
```

```
<Ref    PresentationLevel   id="4030:    143759"
uid="5ec6e2b9-0ceb-1000-aba9-c0a838680000" qual . . . >
<Ref    PresentationLevel   id="4030:    143760"
uid="5ec6e2ba-Oceb-1000-aba9-c0a838680000" qual . . . >
<Ref    PresentationLevel   id="4030:    143761"
uid="Sec6e2bb-Oceb-1000-aba9-c0a838680000" qual . . . >
<Ref    PresentationLevel   id="4030:    143762"
uid="Sec6e2bc-Oceb-1000-aba9-c0a838680000" qual . . . >
</Levels>
```

In some embodiments, Audit 404 can dynamically generate test cases (e.g., Python test cases) and run them with a suitable tool (e.g., XMLRunner, which creates test results in a JUnit-style XML format). Embodiments can leverage certain advantageous infrastructure by generating separate test cases. Because tests are determined by the structure of the semantic model 410 (e.g., RPD), which is only known after model metadata is retrieved from web service 408, embodiments can dynamically create classes and class methods (e.g., Python classes and methods) based on the retrieved metadata. For example, sub-classes of unittest.TestCase for each subject area can be created, and one or more test methods for each test case can be defined in the subject area.

In some embodiments, a separate test case class can be created for each subject area and unit test cases can be created and added (e.g., represented by functions that start with the name 'test'). For example, this organization can group test results related to a subject area into one report. The following example functionality illustrates this technique of dynamically generating sample classes/methods:

```
class DynamicTest(unittest.TestCase):
  client=None
  session=None
  @classmethod
  def make_test_class(cls, className, testFunctions):
  return type(className, (DynamicTest), testFunctions)
  @classmethod
  def make_oas_test_function(cls, sa):
  # returns a method with the test
  def test(self):
  # simple test that checks if service call returns a non null SA description
  # and contains 'Asset' in its name without the prefix (demo purpose only)
  saDescr=cls.client.getServiceAgreementDescription(sa, DynamicTest.session)
  self.assertIsNotNone(saDescr)
  self.assertIn("Asset", sa.displayName[6:], "Unerwarteter Name wurder endeckt!")
  return test
  @classmethod
  def make_oas_test_functions(cls, sas):
  functions=dict( )
  for i in [1,2]:
  index=randint(0, len(sas)−1)
  sa=sas[index]
  test_func=cls.make_oas_test_function(sa)
  functions[f'test_{sa.displayName}']=test_func
  return functions
  if_name_=="_main_":
  DynamicTest.client=OasWSClient('http://slc15smu.us.oracle.com', 9502)
  DynamicTest.session=DynamicTest.client.login('weblogic', 'weblogic123')
  sas=DynamicTest.client.getSAs(DynamicTest.session)
  for sa in sas:
  saFunctions=DynamicTest.make_oas_test_functions(sas)
  name=sa.displayName.replace(' ', '_')
  globalsQ[name]=DynamicTest.make_test_class(name, saFunctions) unittest.main( )
```

The above example functionality generates a class for each subject area and performs two tests for each unit test implemented in two dynamically generated class methods. The test cases can be defined as descriptions/parameters and functions that run each test case can be generated. Embodiments can achieve this organization because the audit tests are defined by the subject area, measures, and attribute(s) that the measures are grouped by. Embodiments can run a standard Python unit test framework with the command unittest.main( ), which can automatically discover test classes and test methods and subsequently run them.

In some embodiments, run test cases and test results can be captured in a Junit XML format that can be converted into HTML. Test cases can be specified as test suite descriptions that are created by one or multiple test strategies. In some embodiments, a runtime component can create the specified test cases and run them in the unit test framework. For example, the functionality of Audit 404 can be implemented using a Jenkins build process.

In some embodiments, Audit 404 retrieves the metadata descriptive of the logical model, analyzes the metadata to determine relationships among the data structures that comprise the logical model, and generates logical queries to test the logical model for inconsistencies. For example, one or more pairs of queries (e.g., a reference query and a test query) can be generated to test for inconsistencies in aggregation functionality, queries can be generated to enumerate joins of a data schema, queries of increasing complexity can be generated to detect performance issues indicative of schema flaws, among other query strategies.

Embodiments can generate one or more logical queries using the following algorithm. The retrieved and analyzed metadata can be used to select one or more measures. For example, an implemented test strategy (e.g., software functionality for a given test strategy) can select the measures based on the analyzed metadata. In some embodiments, the implemented test strategy can then define groups of attributes that the measures can be grouped by. For example, the test strategy can determine attributes to group by based on an analysis of the metadata relevant to the selected measures. In some embodiments, the test strategy can select one attribute per dimension based on a criteria (e.g., PK column), can enumerate drill keys or description columns to be tested as a single group criteria, or can implement any other suitable technique to determine attributes for grouping.

In some embodiments, the test strategy can generate a list of data structures based on the selected measures and determined group by attributes. For example, each data structure can define measures and group by attributes (e.g., attributes relevant for a test pair, or reference query and test query). In some embodiments, a query generator can use the data structure to issue queries. For example, a reference query can sum measures (e.g., all the relevant measures) according to their aggregate rule (e.g., SUM, MIN, MAX, and the like, as defined in the metadata). The result from the reference query can be captured for comparison. A second test query can also be generated that performs the same operation on the measures AND groups them based on the supplied list of one or more attributes. Results from the test query can then be captured for comparison as well.

For example, Audit 404 can generate and issue the reference query and test query such that the queries yield an inconsistent result if the RPD model is not consistent (e.g., aligned the data in the physical data schema, or is otherwise inconsistent). For example, given a list of measures and attributes (e.g., generated data structure), Audit 404 can create a pair of logical SQL queries that can be run (e.g. using a separate API). In some embodiments, the reference query can create the total for each provided measure (e.g., roll all measures to Grand Total for all dimensions). In some embodiments, the test query can report on the same measures and group them by one or multiple attributes. The resulting records can be aggregated back into one record and compared with results from the reference query. In some embodiments, the reference query can query against one, some, or all measures of a fact table and capture the single record as a reference, and the test query can aggregate the same measures and group them by one or multiple attributes.

In some implementations, it is indicated that the semantic model 410 (e.g., RPD model) is inconsistent with the underlying data (e.g., database 412 which implements the data schema) if the sum of measures in the records returned by the test query is not the same as the result of the reference query. In some embodiments, the model has a flaw if one or both of the queries fails with a structured query language ("SQL") error.

In some embodiments, Audit 404 can generate one logical query per subject area that returns one or an array of measures that are aggregated to grand total for multiple dimensions (e.g., of a star in a star schema). For example, the result row can be used to compare the result set of each other test cases in this subject area. In some embodiments, the query can include fact measures that are additive (and not level-based). In other embodiments, the query can include any suitable fact measures.

In some embodiments, the underlying data schema may be a star schema, which can dictate query specifics such that a type of structured query can be represented by simple data structures. For example, much of the query complexity (how facts and dimensions are joined and how normalized dimensions are constructed) can be contained in the logical model (e.g., based on the metadata that represents the schema relationships). Embodiments of the test strategies functionality can provide options about which test strategy to administer. In some embodiments, the number of test cases can be limited to a few hundred or a few thousand. In theory, millions of possible test cases can be generated given the relationships of some data schema/logical models, with runtimes exceeding practical requirements. Embodiments of the test strategy functionality efficiently construct queries to test using practical resource constraints.

Figure 5:
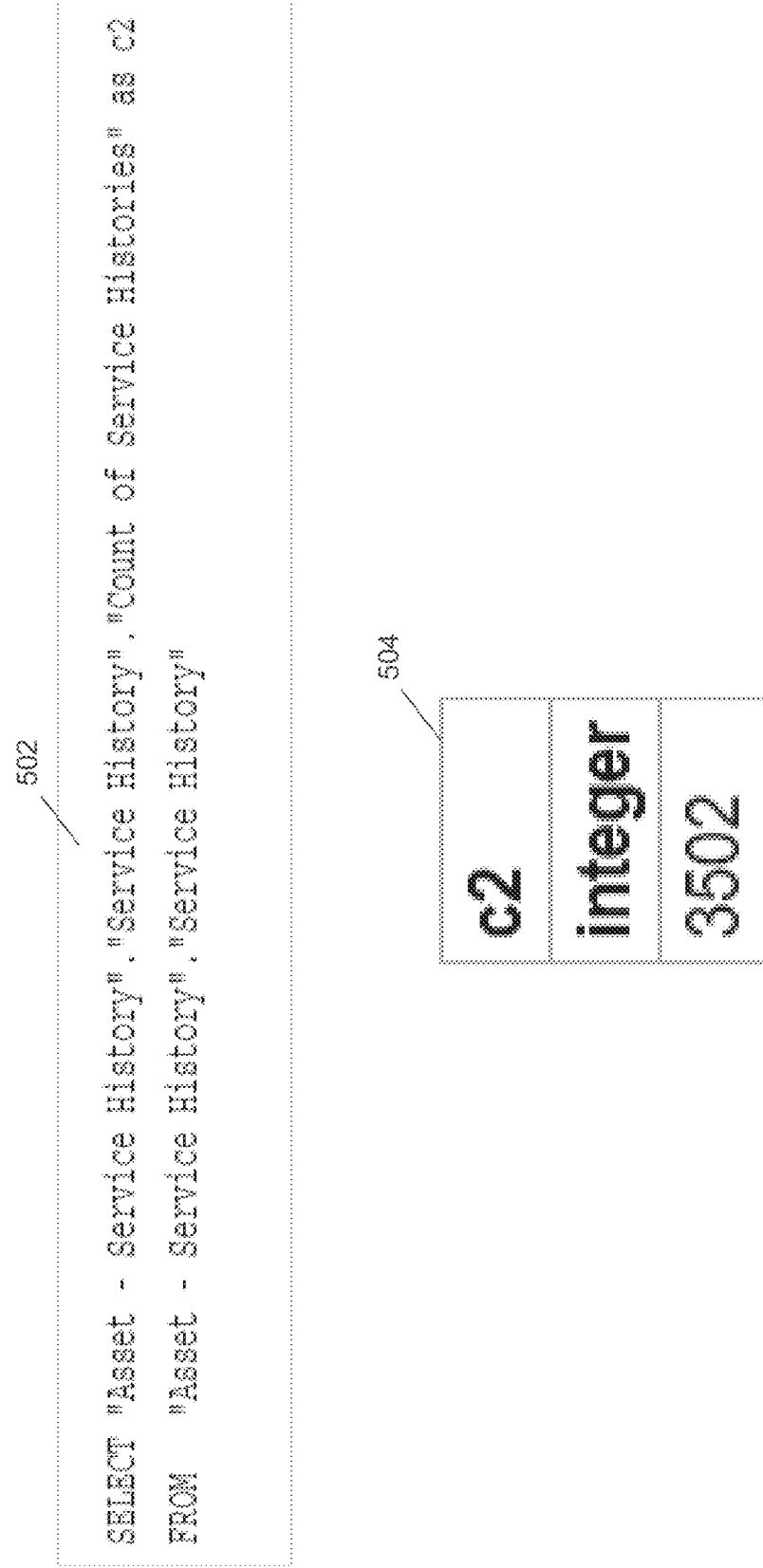

FIGS. 5 and 6 illustrate a pair of database queries and their results according to an example embodiment. In some embodiments, queries can be generated that group the same measures based on one or multiple dimension attributes and aggregate the measures using the model's aggregation rule for the resulting result rows. In the depicted embodiment of FIGS. 5 and 6, query 502 is a reference query that is issued at the subject areas "Asset—Service History" against the measure "Count of Service Histories". The SQL of query 502 indicates that the measure is summed without any grouping. Results 504 depict the results of query 502, which has a data value of 3502.

In the depicted embodiment, query 602 is a test query that is issued at the same subject areas "Asset—Service History" against the same measure "Count of Service Histories". Query 602 differs from query 502 because the SQL of query 602 indicates that the measure is grouped by an attribute "Permit ID" (which is of a referenced logical "Permission" dimension). Results 604 depict the results of query 602, which has 16 rows that group the "Count of Service Histories" measure data values by the "Permit ID" attribute of the "Permission" dimension.

In the depicted embodiment, the sum of the 16 rows of results 604 for the "Count of Service Histories" measure data values is 3502. This equals the summed measure data value without grouping returned for query 502 in results 504. Because these values are equal, query results 504 and 604 do not indicate logical model inconsistency.

Figure 7:
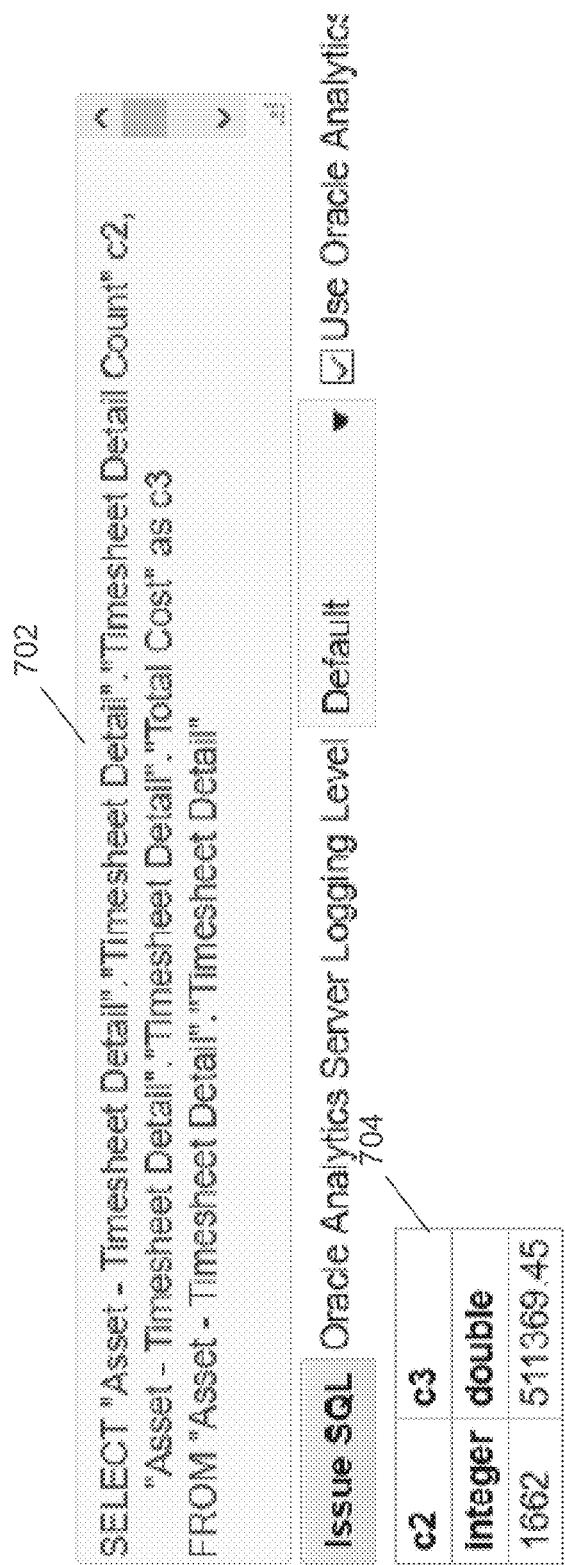

FIGS. 7 and 8 illustrate another pair of database queries and their results according to an example embodiment. In the depicted embodiment of FIGS. 7 and 8, query 702 is a reference query that is issued at the subject areas "Asset—Timesheet Detail" against the measures "Timesheet Detail Count" and "Total Cost". The SQL of query 702 indicates that the measures are summed without any grouping. Results 704 depict the results of query 702, which has a data value of 1662 for the "Timesheet Detail Count" measure and 511369.45 for the "Total Cost" measure.

In the depicted embodiment of FIGS. 7 and 8, the SQL of query 802, the test query, groups additive measures by the PK column 'Timesheet ID' (of the referenced Timesheet dimension). Results 804 depict the results of query 802, which includes multiple results that have been aggregated (because query 802 uses the SUM aggregation rule) per measure. In some embodiments, logical SQL is used to aggregate measures to reduce the logic in the business logic, minimize rounding errors, and improve query performance. For example, this can be accomplished by aggregating measures with the supported aggregate functions. Query 802 repeats the aggregated measure for each group-by attribute (e.g., "Timesheet Detail Count" and "Total Cost") and therefore a first row can be returned (e.g., by database 412 of FIG. 4). In some embodiments, results 804 are reduced to one row by defining RANK( ) on the first dimension attribute and by limiting the rows to the first one with the condition C1=1 in the WHERE clause of query 802.

In the depicted embodiment, the sum in results 804 for the relevant measures does not equal the sum in results 704. Because these values are not equal, query results 704 and 804 indicate an inconsistency. For example, the illustrated inconsistency can be caused by undefined keys, namely that the fact view refers to keys in the Timesheet dimension that are not defined (e.g., data inconsistency).

In some embodiments, aggregation functionality is used within one or more of the reference queries and/or the test queries generated for the logical model. The following aggregation functions can be used when aggregating measures after grouping with a specified aggregation role:

| Aggregation Role | Aggregation Function |
| --- | --- |
| SUM | SUM |
| COUNT | SUM |
| COUNT DISTINCT | SUM |
| MIN | MIN |
| MAX | MAX |

In some implementations, inconsistencies or flaws can be caused by one or more of the following:

For the following issues the reported measure values of the reference query is larger than the summed measure values of the test query:

A join between fact table or dimension table uses an inner join but should be an outer join. This is likely the case because of incorrect metadata at the fact table FK column.

The fact table refers to a dimension with an FK value that does not have a matching PK in the targeted dimension. This may be the result of incorrect data load operations.

A fact or dimension table refers to a description column lookup with an incorrect join. This is likely the case because of incorrect metadata at the fact table Flag column.

Results are incorrect if a binned column is used to group results. This likely implies that the bucket definition is incomplete and does not cover the range of possible binned column values. It may also imply that the selected Bucket type is incorrect.

For the following issues the reported measure values of the reference query may be smaller than the summed measure values of the test query:

Incorrectly defined calculated measures or incorrectly defined cross-drilling may be that root cause for this situation.

In some embodiments, queries issued by Audit 404 can also experience errors, such as SQL errors. For example, SQL Errors can indicate the following issues:

A physical fact or dimension view in the database (e.g., Oracle® DB) is not correctly defined and triggers a SQL exception.

Physical tables or columns do not exist (e.g., due to Oracle® Utilities Application Framework ("OUAF") metadata issues)

The RPD created a virtual table with a defect that causes a SQL exception (e.g., fact wrapper, Characteristics table mapping, binning table)

Connection issues with server 406, which may be a network issue and a recovery can be attempted by logging in again and retrying to issue the query.

In some embodiments, Audit 404 can implement one or more query strategies to enhance resource efficiency and inconsistency discovery. For example, in order to efficiently arrive at a number of issued queries, reference and test queries can include all measures of the fact table under validation/test that can be aggregated (e.g., using SUM, MIN, and MAX aggregation functions). In some embodiments, the aggregation rules defined in the column metadata can define how each measure column is aggregated for the data record created by the test query.

In some embodiments, limiting queries against the time dimension can speed up the runtime of the test strategy and can help to minimize the results set returned. For example, time dimensions can be grouped based on the highest level (e.g., AM/PM drill key) or grouping on Time dimension attributes can be skipped. For example, grouping on the time dimension can be skipped after an initial test validates that the time dimension is properly loaded. In addition, a correlation between inconsistencies of the calendar and time dimensions may exist (e.g., because both are based on the same metadata), and thus individually testing the time dimension may be redundant. Embodiments can explode the time dimension from consideration if the PK regular expression excludes the time dimension PK and drill key regular expression excludes drill keys of the time dimension.

In some embodiments, Audit 404 can generate queries to enumerate joins indicated by the retrieved metadata. For example, one or more of PK, drill keys, binned, and description columns of presentation dimensions associated with a subject area can be identified. Audit queries can group based on one or more of the PK, drill keys, binned, and description columns (e.g., to ensure that parent and grandparent tables are included). Audit queries can also group based on binned and description columns on the fact table. In some embodiments, drill keys of the calendar dimensions can be targeted to ensure that joins between aggregate tables referring to shrunken dimensions are tested. In some embodiments, attribute columns of a child table that is integrated into a logical dimension can also be targeted by generated queries to enumerate joins. In some embodiments, the queries generated to enumerate joins will return an error for a test query if the query takes longer than a specified timeout. For example, the timeout can be a fixed duration of time (e.g., 2 minutes, 5 minutes, and the like) or may be configured as a timeout that is X times larger than the typical query time (e.g., 5× more than the default query time threshold of 1 minute per query).

In some embodiments, one or more queries generated to enumerate joins may be configured to limit the columns to be grouped to a subset of the available features:

PK,
drill keys on dimensions (without PK),
table description columns,
code description column,
binned columns on dimension,
code description on fact,
binned columns on fact, and
child table attributes (feature will be enabled in future version).

In some embodiments, a series of queries can be generated by Audit 404 in which the test queries increase in complexity. For example, a series of queries can be added that sequentially add, as group criteria:

PK,
drill keys on dimensions (without PK),
table description columns,
code description column, or
binned columns on dimension,
drill keys on fact,
binned columns on fact, and
child table attribute on dimension.

In some embodiments, a flaw can be detected based on results for one or more of these issued audit queries if the query duration is longer than a specified timeout, has an inconsistent result, or the time difference between a current query in the series and a previous query in the series is more than a configurable threshold. Some embodiments for generating queries that test complexity can target description and binned columns on fact tables and other available dimension features (e.g., listed above) for the N dimensions of the fact with a highest number of such features. By default, N can be any default number (e.g., 3) and the value can be changed through a configuration option. In some embodiments, calendar and time dimensions are excluded from consideration due to their low complexity. In case two dimensions have a same number of features and already N−1 dimensions have been processed, the first dimension based on an alphanumerical sorting criteria can be selected in some embodiments.

Embodiments can run multiple test cases concurrently. In some embodiments, Audit 404 includes a software tool that supports the following:

usage: Audit.py [-h]--url URL [--port PORT]--user USER --pass PASSWORD [-l]
[-s START] [-e END] [-pk] [-desc] [-bin] [-drill] [-noCalendar] [-one]
Autonomous Dimensional Tester (AUDIT) 1.0.0
optional arguments:
-h, --help show this help message and exit
--url URL BI server URL.
--port PORT BI server port.
--user USER BI server administrative user.
--pass PASSWORD BI server administrator password.
-l, --list List of available subject areas in the BI Server.
-s START, --startinterval START Start index for Subject Area list.
-e END, --endinterval END End index for Subject Area list.
-pk, --primarykeys Group by primary keys.
-desc, --descriptionColumns Group by description columns.
-bin, --binColumns Group by Bin columns.
-drill, --drillKeyColumns Group by drill key columns.
-noCalendar, --noCalendarAndTime
Skip grouping by calendar and time dimensions attributes.
-one, --oneMeasure Creates queries with one measure.

Embodiments improve that quality of an implemented logical model and/or database without excessive manual testing. For example, the following can be identified by embodiments: inconsistencies between a database schema, its sample data, and the RPD model; FKs that are declared not nullable+required in the RPD model but contain NULL or Strings with spaces (this is typically an issue with fact views); tables that have not been fully loaded or updated; and queries with unexpected performance degradation indicating modeling issues or view definition issues.

Figure 9:
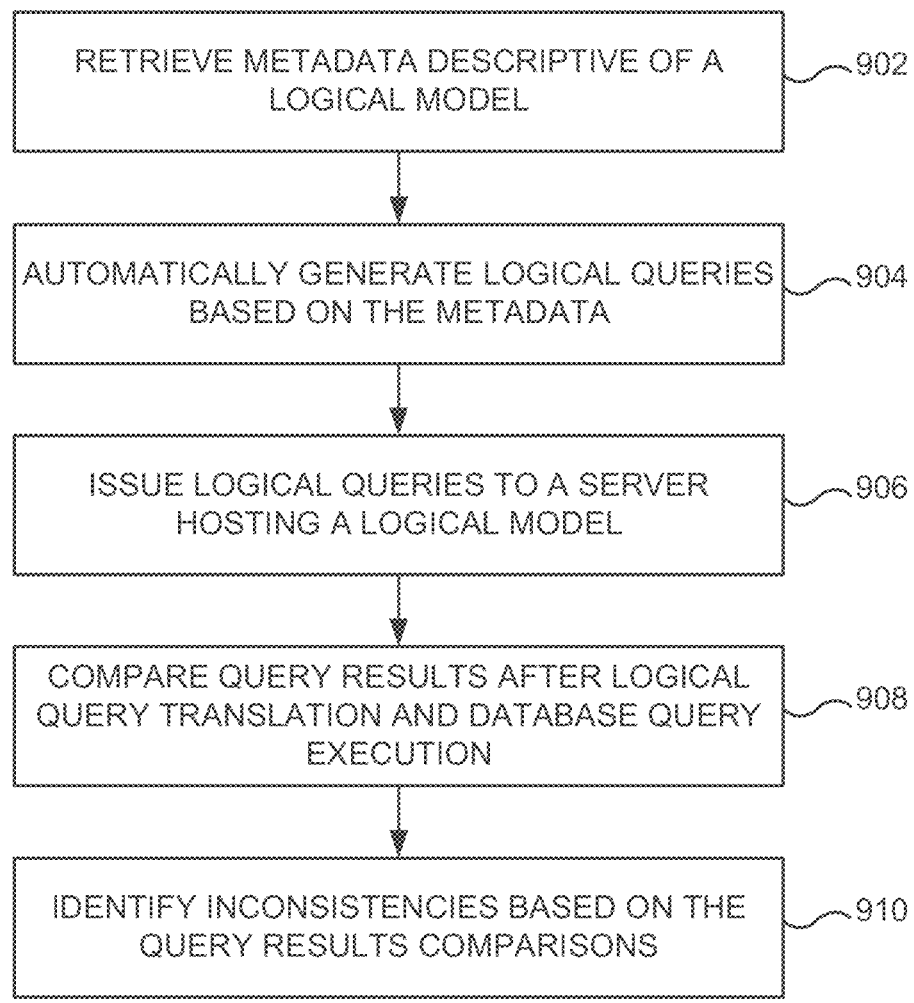
FIG. 9 illustrates an example flow diagram for autonomously testing a logical model for inconsistencies according to an example embodiment.

FIG. 9 illustrates an example flow diagram for autonomously testing a logical model for inconsistencies according to an example embodiment. In one embodiment, the functionality of FIG. 9 is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 902, metadata descriptive of a logical model can be retrieved, where the logical model is an abstraction for a database schema, the database schema is implemented at a database, and the database schema includes a fact table and one or more dimension tables. For example, metadata for portions of a logical model (e.g., a subject area) can be retrieved from a server that implements the logical model. In some embodiments the metadata is retrieved using a web service API.

In some embodiments, the metadata describes a logical schema against which logical queries can be issued. For example, the server that manages the metadata and/or implements the logical model can translate logical queries issued against the logical model to database queries issued against the underlying database. In some embodiments, the metadata can be managed in the form of an RPD.

At 904, a plurality of logical queries including at least a first logical query and a second logical query can be automatically generated based on the retrieved metadata, where the first logical query and second logical query target a logical object of the logical model. For example, logical queries for issuance against the logical model as defined by the RPD metadata can be generated based on the retrieved metadata.

At 906, at least the first logical query and the second logical query can be issued to the server that hosts the logical model, where, at the server, the first logical query is translated to a first database query and the second logical query is translated to a second database query, and the first database query and second database query target at least a fact table and a dimension table from the database schema. In some embodiments, the first and second logical queries can be generated based on metadata associated with the targeted logical object, and the first and second database queries can target the fact table and the dimension table from the database schema based on mappings for the targeted logical object that are used to translate the first logical query and second logical query.

In some embodiments, the first and second database queries are a pair of database queries configured to test the logical model using an aggregation function associated with the targeted logical object. In some embodiments, the first database query aggregates measure data values along one or more dimensions based on aggregation function definitions for the measure data defined in the metadata and the second database query groups multiple of the measure data values by one or more dimension attributes. In some embodiments, the first database query aggregates measure data values along all dimensions for the measure based on dimension definitions for the measure and aggregation function definitions for the measure data defined in the metadata At 908, query results received from execution of the first database query and second database query can be compared. For example, comparing query results for the pair of database queries can include comparing the aggregated measure data value (e.g., returned by the first database query) to a sum of the grouped measure data values (e.g., returned by the second database query).

At 910, one or more inconsistencies can be identified when the comparison of the query results for the first database query and second database query does not meet a criterion, wherein the one or more inconsistencies can be an inconsistency with the logical model as defined by the metadata or an inconsistency at the database. In some embodiments, the at least one inconsistency is identified when a difference between the aggregated measure data value and the sum of the grouped measure data values is greater than a threshold value. The at least one inconsistency can be identified for one or more of a relationship between the targeted logical object and the targeted fact table and dimension table defined in the metadata, data loaded into the targeted fact table and dimension tables in the database, and column configuration metadata defined for the targeted fact table and the dimension table in the metadata.

In some embodiments, automatically generating the plurality database queries includes automatically generating a plurality of pairs of database queries such that a first of each pair of database queries includes aggregation of a given measure data value across one or more dimensions and a second of each pair of database queries groups multiple of the given measure data values by one or more dimension attributes. For example, the plurality of pairs of logical queries can be issued to the server that hosts the logical model, where, at the server, each pair of logical queries can be translated to a pair of database queries that target at least a fact table and a dimension table from the database schema.

In some embodiments, the query results received from execution of the pairs of database queries can be compared and one or more inconsistencies can be identified when the comparison of the query results for each pair of database queries does not meet a criterion, where the one or more inconsistencies comprise an inconsistency with the logical model as defined by the metadata or an inconsistency at the database.

In some embodiments, the automatically generated pairs of database queries are configured to test the logical model using an aggregation function associated with at least one logical object targeted by each pair. For example, for the issued pairs of logical queries, a given pair of the logical queries can be generated based on metadata associated with the at least one logical object targeted by the given pair, and a given pair of database queries translated based on the given pair of logical queries can target at least a fact table and a dimension table from the database schema based on mappings for the given logical object targeted that are used to translate the given pair of logical queries. In some embodiments, the automatically generated pairs of database queries test multiple logical objects from the logical model and the translated pairs of database queries test multiple fact and dimension tables from the database.

Embodiments achieve autonomous testing of a logical model for inconsistencies. For example, data schemas can at times require complex queries that target relevant data from numerous tables/fields using joins and other sophisticated query structures. To alleviate this query burden, some databases implementations and reporting tools include a logical model, or a layer that maps the underlying complex data schema to a more simplified logical model. For example, the logical model can then be queried using more simplistic logical queries, which can be translated to queries that target the underlying data schema (e.g., translated into complex queries that can access/retrieve data from the underlying data schema).

Some embodiments of logical models can include multiple layers of intricacies, including various aggregation functionality, drill-down functionality, join behaviors, and much more. For example, one or more tools can be used to rapidly develop a complex logical model, such as by defining metadata that can be used to deploy the model. In some embodiments, a tool can be used to define a conceptual data model through a user interface, and the output of such a tool can be metadata that stores the conceptual relationships of the components that comprise the logical data model.

In some embodiments, these tools can improve the efficiency of deploying a complex database, however the deployment can sometimes include low level inconsistencies and/or flaws. For example, aggregation functionality defined in the logical model may not align with the underlying data schema, one or more tables may not be properly loaded, the configurations for a data field (e.g., cannot be null) may not be properly set, and many more. These inconsistencies and/or flaws conventionally require detailed manual effort to debug.

Embodiments generate queries based on the metadata for a logical model that autonomously test for inconsistencies and/or flaws in the logical model's implementation with the underlying data schema. For example, metadata for a logical model can be retrieved and analyzed to determine conceptual relationships among the components of the model. In some embodiments, queries can be generated based on the expected behavior of the logical model and data schema given the analyzed metadata. For example, a pair of queries can be generated that test for expected aggregation functionality (e.g., across one or more dimensions of the data schema).

Embodiments analyze the results of the queries. For example, two or more queries can be designed to return a similar result set (e.g., the same data values) when the logical data model accurately reflects the data relationships in the data schema. Returned result sets that are not similar for these two or more queries can indicate an inconsistency with the logical model. In other examples, query errors may be returned due to improper loading of data, missing database tables or columns, incorrect embedded SQL expressions, and/or improper configuration for data fields. In some embodiments, these results that deviate from expected results can be used to identify one or more of these inconsistencies.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

I claim:

1. A method for autonomously testing a logical model for inconsistencies, the method comprising:
retrieving metadata descriptive of a logical model, wherein the logical model comprises an abstraction for a database schema, the database schema is implemented at a database, and the database schema comprises a fact table and one or more dimension tables;
automatically generating a plurality of logical queries comprising at least a first logical query and a second logical query based on the retrieved metadata, wherein the first logical query and second logical query target a logical object of the logical model;
issuing at least the first logical query and the second logical query to a server that hosts the logical model, wherein, at the server, the first logical query is translated to a first database query and the second logical query is translated to a second database query, and the first database query and second database query target at least a fact table and a dimension table from the database schema;
comparing query results received from execution of the first database query and second database query; and identifying one or more inconsistencies when the comparison of the query results for the first database query and second database query does not meet a criterion, wherein the one or more inconsistencies comprise an inconsistency with the logical model as defined by the metadata or an inconsistency at the database.

2. The method of claim 1, wherein the first and second database queries comprise a pair of database queries configured to test the logical model using an aggregation function associated with the targeted logical object.

3. The method of claim 2, wherein the first and second logical queries are generated based on metadata associated with the targeted logical object, and the first and second database queries target the fact table and the dimension table from the database schema based on mappings for the targeted logical object that are used to translate the first logical query and second logical query.

4. The method of claim 3, wherein the first database query aggregates measure data values along one or more dimensions based on aggregation function definitions for the measure data defined in the metadata and the second database query groups multiple of the measure data values by one or more dimension attributes.

5. The method of claim 4, wherein the first database query aggregates measure data values along all dimensions for the measure based on dimension definitions for the measure and aggregation function definitions for the measure data defined in the metadata.

6. The method of claim 4, wherein comparing query results for the pair of database queries comprises comparing the aggregated measure data value to a sum of the grouped measure data values.

7. The method of claim 6, wherein the at least one inconsistency is identified when a difference between the aggregated measure data value and the sum of the grouped measure data values is greater than a threshold value.

8. The method of claim 7, wherein the at least one inconsistency is identified for one or more of a relationship between the targeted logical object and the targeted fact table and dimension table defined in the metadata, data loaded into the targeted fact table and dimension tables in the database, and column configuration metadata defined for the targeted fact table and the dimension table in the metadata.

9. The method of claim 3, wherein automatically generating a plurality database queries comprises automatically generating a plurality of pairs of database queries such that a first of each pair of database queries includes aggregation of a given measure data value across one or more dimensions and a second of each pair of database queries groups multiple of the given measure data values by one or more dimension attributes.

10. The method of claim 9, further comprising:
issuing the plurality of pairs of logical queries to the server that hosts the logical model, wherein, at the server, each pair of logical queries is translated to a pair of database queries that target at least a fact table and a dimension table from the database schema;
comparing query results received from execution of the pairs of database queries; and
identifying one or more inconsistencies when the comparison of the query results for each pair of database queries does not meet a criterion, wherein the one or more inconsistencies comprise an inconsistency with the logical model as defined by the metadata or an inconsistency at the database.

11. The method of claim 10, wherein the automatically generated pairs of database queries are configured to test the logical model using an aggregation function associated with at least one logical object targeted by each pair.

12. The method of claim 11, wherein, for the issued pairs of logical queries, a given pair of the logical queries is generated based on metadata associated with the at least one logical object targeted by the given pair, and a given pair of database queries translated based on the given pair of logical queries targets at least a fact table and a dimension table from the database schema based on mappings for the given logical object targeted that are used to translate the given pair of logical queries.

13. The method of claim 12, wherein the automatically generated pairs of database queries test multiple logical objects from the logical model and the translated pairs of database queries test multiple fact and dimension tables from the database.

14. A system for autonomously testing a logical model for inconsistencies, the system comprising:
a processor; and
memory storing instructions for execution by the processor, the instructions configuring the processor to:
retrieve metadata descriptive of a logical model, wherein the logical model comprises an abstraction for a database schema, the database schema is implemented at a database, and the database schema comprises a fact table and one or more dimension tables;
automatically generate a plurality of logical queries comprising at least a first logical query and a second logical query based on the retrieved metadata, wherein the first logical query and second logical query target a logical object of the logical model;
issue at least the first logical query and the second logical query to a server that hosts the logical model, wherein, at the server, the first logical query is translated to a first database query and the second logical query is translated to a second database query, and the first database query and second database query target at least a fact table and a dimension table from the database schema;
compare query results received from execution of the first database query and second database query; and
identify one or more inconsistencies when the comparison of the query results for the first database query and second database query does not meet a criterion, wherein the one or more inconsistencies comprise an inconsistency with the logical model as defined by the metadata or an inconsistency at the database.

15. The system of claim 14, wherein the first and second database queries comprise a pair of database queries configured to test the logical model using an aggregation function associated with the targeted logical object.

16. The system of claim 15, wherein the first and second logical queries are generated based on metadata associated with the targeted logical object, and the first and second database queries target the fact table and the dimension table from the database schema based on mappings for the targeted logical object that are used to translate the first logical query and second logical query.

17. The system of claim 16, wherein the first database query aggregates measure data values along one or more dimensions based on aggregation function definitions for the measure data defined in the metadata and the second database query groups multiple of the measure data values by one or more dimension attributes.

18. The system of claim 17, wherein the first database query aggregates measure data values along all dimensions for the measure based on dimension definitions for the measure and aggregation function definitions for the measure data defined in the metadata.

19. The system of claim 17, wherein comparing query results for the pair of database queries comprises comparing the aggregated measure data value to a sum of the grouped measure data values.

20. A non-transitory computer readable medium having instructions stored thereon that, when executed by a processor, cause the processor to autonomously test a logical model for inconsistencies, wherein, when executed, the instructions cause the processor to:
- retrieve metadata descriptive of a logical model, wherein the logical model comprises an abstraction for a database schema, the database schema is implemented at a database, and the database schema comprises a fact table and one or more dimension tables;
- automatically generate a plurality of logical queries comprising at least a first logical query and a second logical query based on the retrieved metadata, wherein the first logical query and second logical query target a logical object of the logical model;
- issue at least the first logical query and the second logical query to a server that hosts the logical model, wherein, at the server, the first logical query is translated to a first database query and the second logical query is translated to a second database query, and the first database query and second database query target at least a fact table and a dimension table from the database schema;
- compare query results received from execution of the first database query and second database query; and
- identify one or more inconsistencies when the comparison of the query results for the first database query and second database query does not meet a criterion, wherein the one or more inconsistencies comprise an inconsistency with the logical model as defined by the metadata or an inconsistency at the database.

* * * * *